United States Patent Office 3,674,438
Patented July 4, 1972

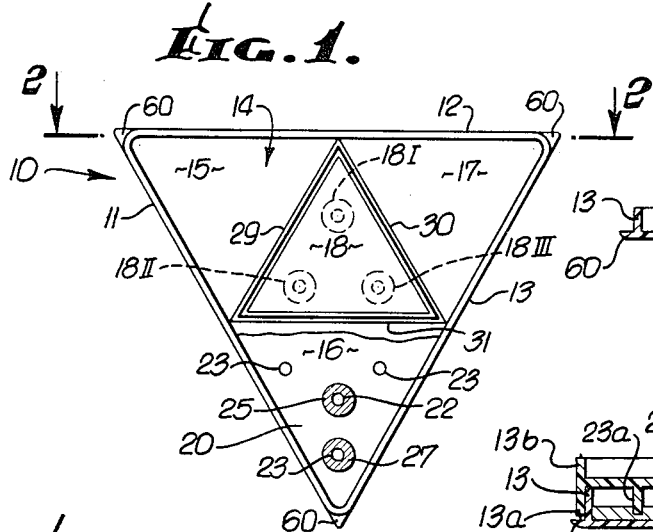
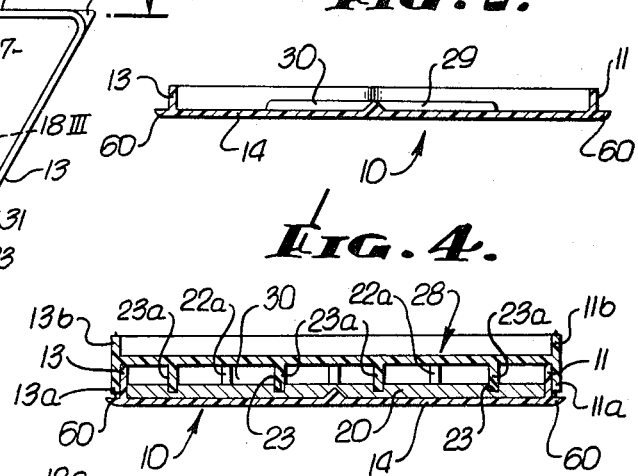
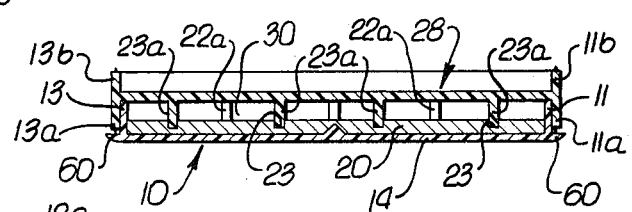
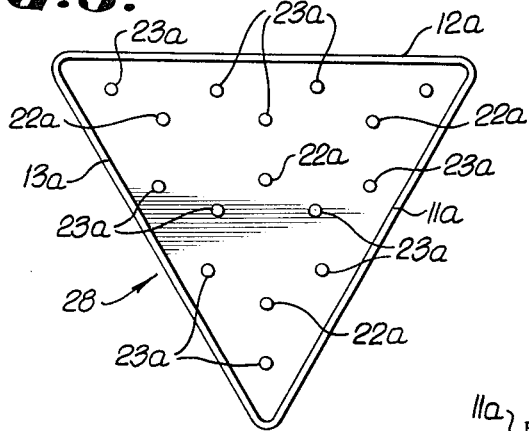
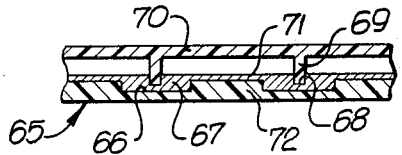
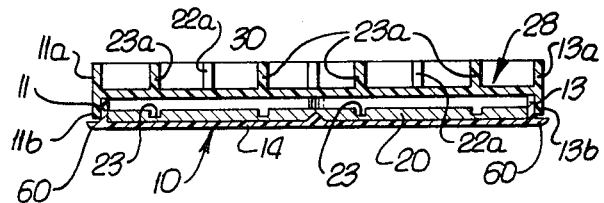
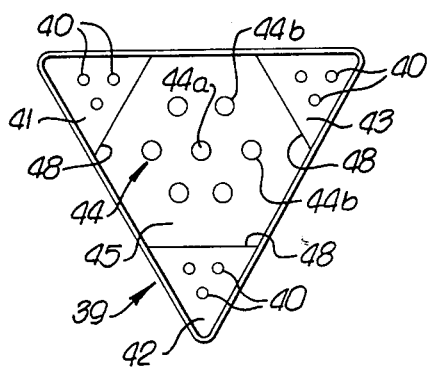
INVENTOR.
JAMES T. SHEN

3,674,438
OUCHTERLONY TECHNIQUE APPARATUS
James T. Shen, 940 Cornell Road,
Pasadena, Calif. 91106
Filed May 20, 1970, Ser. No. 38,978
Int. Cl. B22c 9/22; G01n 33/16
U.S. Cl. 23—253 R                16 Claims

ABSTRACT OF THE DISCLOSURE

Ouchterlony technique apparatus comprises a generally triangular tray, and a layer of diffusing material in the tray forming at least three groups of wells arranged in a triangular pattern generally conforming with the tray triangular shape.

BACKGROUND OF THE INVENTION

This invention relates generally to Ouchterlony technique apparatus, i.e. for study of antigen-antibody reactions; more specifically, the invention concerns improvements in gel plate or tray structures as used in such studies.

Double-diffusion tests for studying precipitation effects are known as Ouchterlony technique. Examples of such tests are qualitative assays of the Immuno-globulin G (IgG) in human whole serum, wherein a series of human whole serum of various dilutions react against horse anti-human IgG. For quantitative studies a single radial diffusion is employed, a specific antiserum being mixed with agar (for example) so that when the serum specimen is placed in an agar well, it forms a radial precipitant zone, the diameter of which is dependant on the concentration of its specific antigen content. The quantity, in milligram percent is obtained by comparing the size of the zone diameters with the known value of reference standards.

Typically, the antigen and antibody reactants of various concentrations are placed in wells formed in a gel layer on a plate so that the reactants may diffuse in the gel and form precipitation lines for study. The wells are punched in the gel, as for example agar, by means of a special mechanical device for this purpose. This procedure is time-consuming and therefore expensive; also, the chance of mechanical malfunctioning leading to wastage of the plates is ever present. Also, where the wells are conventionally punched out, the bottom of the wells are exposed to the undersides of the plastic plate, enhancing the possibility of reactant sample seepage under the gel and destroying the desired evenness of diffusion.

SUMMARY OF THE INVENTION

It is a major object of the invention to provide apparatus and method overcoming the problems referred to above, as well as other problems encountered in the art.

Basically, the invention is embodied in apparatus that comprises a generally triangular plate or tray, and a gel layer in the tray forming at least three groups of wells arranged in a triangular pattern conforming with the plate or tray of triangular shape. The wells typically may have depths less than the thickness of the gel layer to prevent uneven diffusion problems; and the layer may form a fourth group of wells located generally centrally of the tray, the various groups enabling multiple double-diffusion studies to proceed. For example, the groups may define well patterns including a central well and peripheral wells spaced therefrom. The wells in all the groups may have the same shape and cross-sectional area, for uniformity of testing conditions; or, the wells in the three outer groups may be closer together than the wells in the central group for use in making faster preliminary studies, the central group wells also being of larger size to provide finer resolution of precipitation lines formed over longer periods of time for detail studies. Further, ridges may be provided on the tray bottom to separate different groups of wells.

Another important object of the invention is the provision of a cover fitting on the tray to serve the multiple functions of maintaining the tray interior suitably moist during storage and shipment; to form the wells in the gel layer; and to be reversible so as to protect the tray interior from contamination during the test. In this regard, the cover typically has multiple fingers projecting toward the tray interior for moulding the wells; also, it may have lips on both sides thereof to interfit the tray. After the tray is opened, the wells are already formed according to the designed groups of fingers, the cover is then put back on the reverse side so that the fingers project away from the interior to avoid disturbance of agar wells. The lips or flanges on the cover may closely interfit the tray to provide a seal against contamination of the gel.

These and other objects and advantages of the invention, as well as the details of illustrative embodiments, will be more fully understood from the following detailed description and drawings, in which:

DRAWING DESCRIPTION

FIG. 1 is a plan view of the interior of a tray embodying the invention;
FIG. 2 is a cross-section taken on line 2—2 of FIG. 1;
FIG. 3 is a plan view of the interior of a cover for the FIG. 1 tray;
FIG. 4 is an elevation taken in section and showing the cover assembled to the tray;
FIG. 5 is a view similar to FIG. 4, but showing the cover reversed;
FIG. 6 is a plan view showing the interior of a modified tray; and
FIG. 7 is a section showing a modified tray.

DETAILED DESCRIPTION

In FIGS. 1-5, the tray 10, which may consist of molded transparent plastic material, is generally triangular in outline as defined by side walls 11, 12 and 13 and triangular bottom wall 14. As indicated, the triangle may be equilateral, this construction enabling the formation of three triangular outer or corner zones indicated at 15, 16 and 17. The latter are separated from a triangular center zone 18 by ridges 29, 30 and 31.

As seen in FIGS. 1, 4 and 5, a diffusion gel layer 20, as for example may consist of agar, extends over the bottom of the tray to slightly exceed the depth of the ridges. The gel layer forms several, as for example three similar groups of wells, one group in each of the areas or zones 15, 16 and 17, so that the groups are arranged in a generally triangular pattern conforming with the tray Triangular shape. Each such group may advantageously include a central well 22 and multiple peripheral wells 23 spaced from the central well. The wells are typically of uniform size so as to eliminate sources of error. The agar gel may for example initially contain specific antibody mixed therein; therefore, after the wells are filled with sample specimen containing homologous antigen there is formed a radial precipitation zone of antigen and antibody complex indicated at 25 and 27 in FIG. 1. The sizes of the zone diameters are then compared with reference standards in area 18 which were provided with known values of antigen content. These known values of antigen in milligram percent are plotted against the diameters of the precipitating zones 18I, 18II and 18III (shown in broken lines), thus forming a linear line within a given period of time and temperature. The use of multiple groups of wells increases the number of serum specimens obtainable from one single immuno-plate, without undue wastage of reference standard material. This procedure is known as single radial diffusion.

The depths of the wells, in FIGS. 4 and 5, is less than the thickness of the layer 20, to eliminate seepage thereunder and erroneous rates of diffusion.

FIGS. 3–5 show a cover 28 carrying fingers 22a and 23a arranged in groups conforming to those discussed above, each finger group including a central finger 22a and three peripheral fingers 23a. When the cover is applied to the tray in one mode, as seen in FIG. 4, the fingers project toward the tray interior and are received in the gel layer 20 at the wells, whereby the fingers may form the wells in the first instance prior to stiffening of the gel solution after pouring of some into the tray. At the same time, the cover interfits the tray, as afforded by lips or flanges 11a, 12a and 13a sidewardly sealingly overlapping the walls 11, 12 and 13 respectively, so that the tray interior may be kept free of contamination with the fingers projecting in the wells to keep them free of any contamination within the closed interior 30 of the assembly. All of this promotes reliability of performance of the resultant device in tests.

The cover also has other lips 11b, 12b and 13b projecting at the side of the cover opposite shoulders 11a, 12a and 13a, so as to interfit the tray when the cover is reversed as seen in FIG. 5. In that configuration, the fingers project away from the assembly interior 30, as is useful when a test is being carried out, so as not to disturb the contents and still enable usage of the same cover to keep the interior moistened.

FIG. 6 illustrates a modified tray construction 39 well adapted to double-diffusion studies, and wherein three small size wells 40 are formed in each of three corner areas 41–43, as indicated. Such wells are designed for preliminary studies of antigen-antibody reactions, and over relatively short periods of time due to the closeness of the wells.

A central group of wells 44 in central area 45 affords more detailed studies of the same reactions, as for example to obtain finer resolutions of precipitation lines, over longer periods of time due to the greater quantities and distance between the wells. Note that the cross sectional areas of wells 44 exceed the cross sectional areas of wells 40, to a substantial degree. The center well 44a together with a pair of outer wells 44b is a replica image of a corner well set, there being three such replica images as shown.

Merely as an example, the center-to-center distance of wells 44a and 44b may be about 9 mm., with the diameters of wells 44a and 44b being about 5 mm.; the center to center distance of wells 40 may be about 3 mm., and their diameters may be about 2 mm. The tray 39 may measure 6 cm. on each side, and may contain about 4 cm.$^3$ of prepared agar. The side walls of the tray may be the same as described above in FIG 1, and ridge 48 may separate the corner areas from the center area. A cover may be employed in the same manner as cover 28 in FIGS. 4 and 5. The large wells 44a and 44b each require no more than $3\mu$ to $5\mu$ liters of sample, and the small wells 40 no more than $1-3\mu$ liter, which represents a substantial saving of expensive sample material over prior apparatus.

Also, in FIGS. 1–5, center holes 22a may be eliminated.

The extreme corners of the tray 10 in FIGS. 1, 2 and 4 are shown as projecting at 60 beyond the outer boundaries of the cover 28, so as to permit hand grasping of the tray when the cover is also to be grasped for removal.

FIG. 7 shows a modified tray 65 having recesses 66 formed therein to receive gel such as agar at 67, and in which the wells 68 are molded by the fingers 69 on the cover 70. Agar may also extend in a thin film at 71 over the tray plastic body 72, for continuity. This construction eliminates wastage of agar or other diffusion material.

I claim:
1. Ouchterlony technique apparatus, comprising
   (a) a generally triangular tray,
   (b) a layer of diffusing material in the tray forming at least three groups of wells arranged in a triangular pattern generally conforming with the tray triangular shape, and
   (c) a triangular cover on the tray, the cover carrying fingers projecting toward the tray interior for molding said wells, the cover having certain peripheral lips interfitting the tray periphery to enclose the tray interior, the cover also having other peripheral lips projecting opposite said certain lips to interfit the tray periphery when the cover is reversed so that the fingers project away from the tray interior while the tray interior remains enclosed.
2. The apparatus of claim 1 wherein said layer is selected from the group consisting of agar and a mixture of agar and antiserum.
3. The apparatus of claim 1 wherein the depths of the wells as measured from the top of the layer are less than the thickness of said layer.
4. The apparatus of claim 1 wherein the layer forms a fourth well group located generally centrally of the tray, said three groups located outwardly of the fourth group.
5. The apparatus of claim 4 including ridges on the tray bottom separating the fourth group from said three groups.
6. The apparatus of claim 4 wherein the well pattern in each of said three groups is the same.
7. The apparatus of claim 6 wherein each of said well patterns is defined by a central well and multiple peripheral wells spaced therefrom.
8. The apparatus of claim 6 wherein the well pattern in said fourth group is defined by a central well and multiple peripheral wells.
9. The apparatus of claim 8 wherein the well openings in all groups have approximately the same cross sectional areas and shapes.
10. The apparatus of claim 8 wherein the well openings in the fourth group have approximately the same cross sectional areas and shapes, said areas substantially exceeding the areas of the well openings in said three groups.
11. Ouchterlony technique apparatus, comprising
    (a) a tray adapted to contain a gel, and
    (b) a cover on the tray and carrying fingers projecting within the tray interior for forming wells in the gel, the cover having certain peripheral lips which sealingly interfit the tray, the cover also having other peripheral lips at the opposite side thereof which are located to sealingly interfit the tray when the cover is reversed so that the fingers project away from the tray interior, the tray interior being enclosed when either said certain lips or said other lips sealingly engaged the tray,
12. The apparatus of claim 11 wherein the fingers are out of contact with the tray.
13. The apparatus of claim 11 wherein the tray and cover consist of transparent plastic material.
14. The apparatus of claim 11 wherein the tray has a bottom wall forming multiple spaced recesses to receive the gel.

15. The apparatus of claim 11 wherein the tray and cover are polygonal.

16. The apparatus of claim 15 wherein the tray and cover are triangular.

References Cited

UNITED STATES PATENTS

| | | | |
|---|---|---|---|
| 3,012,284 | 12/1961 | Touhey, Jr. | 249—142 X |
| 3,165,450 | 1/1965 | Scheidt | 195—139 LE |
| 3,554,704 | 1/1971 | Ushakoff | 23—230 B X |

OTHER REFERENCES

A. J. Crowle: Immundodiffusion, Academic Press, 1961, pp. 202 to 207, 212 to 215, 219 relied on.

JOSEPH SCOVRONEK, Primary Examiner

R. M. REESE, Assistant Examiner

U.S. Cl. X.R.

23—230 B, 259, 292; 249—144, 160